April 17, 1962
H. STANGE
3,030,418
STABILIZATION OF DIBORANEACETYLENE
LIQUID REACTION PRODUCTS
Filed March 22, 1956
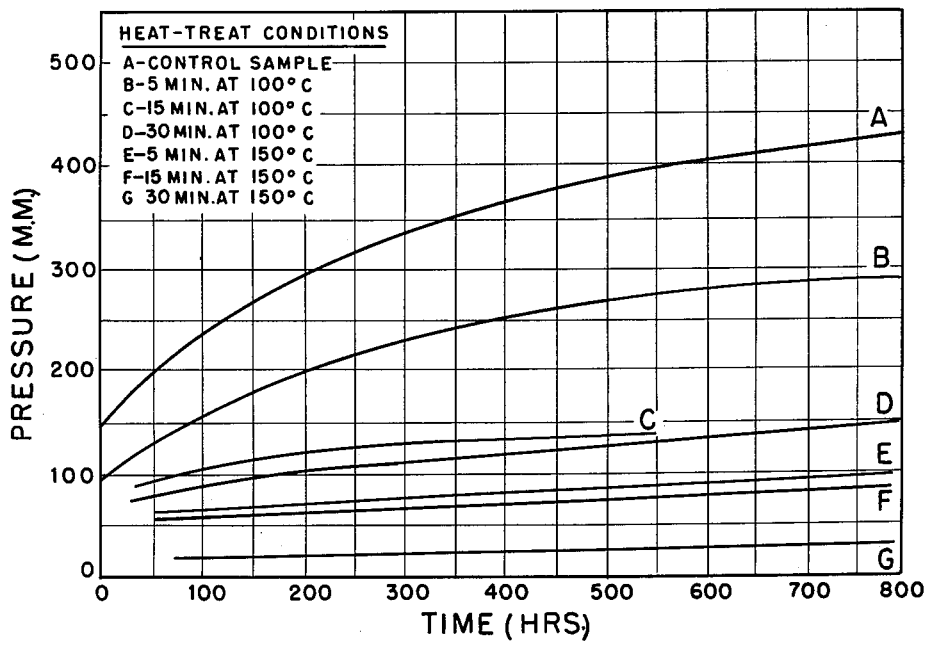
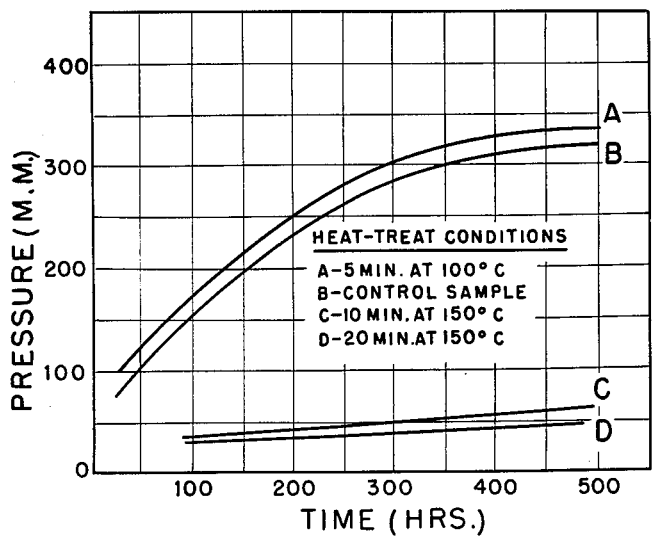
INVENTOR.
Hugo Stange
BY Adams, Forward & McLean
ATTORNEYS

United States Patent Office 3,030,418
Patented Apr. 17, 1962

3,030,418
STABILIZATION OF DIBORANEACETYLENE
LIQUID REACTION PRODUCTS
Hugo Stange, Niagara Falls, N.Y., assignor, by mesne assignments, to Olin Mathieson Chemical Corporation, a corporation of Virginia
Filed Mar. 22, 1956, Ser. No. 573,233
1 Claim. (Cl. 260—606.5)

This invention relates to the stabilization of liquid borohydrocarbons produced by reacting diborane and acetylene or methylacetylene.

The production of liquid borohydrocarbons has been previously proposed by the reaction of diborane and unsaturated hydrocarbons in the gaseous phase and in admixture with an inert diluent gas at temperatures elevated by direct or indirect heat exchange. Such liquid borohydrocarbons have high heats of combustion and are useful as high energy fuels when burned with air, for example, as described in application Serial No. 533,944, filed September 13, 1955 in the names of Earl A. Weilmuenster and Joel A. Zaslowsky. In addition to having high heats of combustion, however, high energy fuels should be characterized by, for example, low vapor pressure, low viscosity, slight tendency to be pyrophoric, low toxicity, low freezing point and good storage stability. Although the liquid borohydrocarbons produced by the reaction of diborane and unsaturated hydrocarbons described above have satisfactory storage stability, it has now been found that certain of these liquid borohydrocarbons, particularly those produced by the reaction of diborane and acetylene or methylacetylene can be further stabilized with respect to vapor pressure without undue change in other properties by heat treatment under particular conditions of temperature and time.

Thus according to the method of this invention liquid reaction products of diborane and acetylene or methylacetylene are stabilized with respect to vapor pressure by heating such reaction products at a temperature of 140–200° C. for from 10 to 45 minutes.

EXAMPLE I

Part 1

A mixture of hydrogen and diborane is reacted with a mixture of hydrogen and methylacetylene. The apparatus employed comprises a heating coil surrounding a dispersion tube longitudinally situated in the center of an elongated jacketed reaction chamber. The heating coil and jacket are connected in series and mineral oil at 140° C. is circulated through the system. The dispersion tube contains a number of small holes of about 1 mm. diameter. A thermocouple inserted into a glass tube situated at the lower end of the dispersion tube measures the reaction temperature. The mixture of hydrogen and methyl acetylene is passed into the dispersion tube, the mixture of hydrogen and diborane is introduced into the concentric space surrounding the dispersion tube, and when the reactor is at the proper temperature, the reaction is initiated and proceeds smoothly. The reaction products is condensed in a series of traps cooled to −78° C. The pertinent data with respect to two runs are set out in Table I below.

TABLE I.—REACTION OF DIBORANE WITH METHYLACETYLENE

| | | |
|---|---|---|
| Operating Time, Min | 393 | 286 |
| Observed Operating Temp., °C | 125–166 | 130–158 |
| Ratio, $H_2:B_2H_6:C_3H_4$ | 10:3:1 | 10:3:1 |
| Flow Rate, $B_2H_6$, cc./min | 661 | 566 |
| Flow Rate, $C_3H_4$, cc./min | 215 | 217 |
| Flow Rate, $H_2$ cc./min | 2,275 | 2,275 |
| Materials in Moles: | | |
| $B_2H_6$ | 11.59 | 7.23 |
| $CH_3C:CH$ | 3.78 | 2.78 |
| $H_2$ | 39.60 | 29.10 |
| Materials Out: | | |
| Product, grams | 165 | 98 |
| Percent B (Av. values) | 30.8 | 29.2 |

The liquid products of these two runs are combined.

Part 2

The combined liquid products of Part 1 are then stabilized.

The apparatus employed comprises a 250 ml. flask equipped with a vacuum stop-cock and connected to a water-cooled reflux condenser. The condenser top is equipped with a T-tube, one end of which is attached, in series, to a trap cooled with Dry Ice and a mercury bubble-off, and the other end to a dry nitrogen source. An oil bath held at constant temperature, is used as the heat source.

Approximately 20 ml. (15.1 g.) of the combined liquid products of Part 1 are introduced into the reaction flask by means of a pipette. The entire system is purged with nitrogen and the reaction flask is placed in an oil bath held at 100° C. After five minutes the bath is removed and the flask is allowed to cool in the air to room temperature. The non-volatile portion remaining in the reaction flask is subjected to stability and other tests, the results of which are reported in Table II below together with tests on other portions of the combined liquid products of Part 1 similarly heat treated under the temperature and time conditions set out in Table II.

In Table II, the difference in weight of the flask and contents before and after heating is reported as the weight loss. The volatile portion collected in a trap cooled with Dry Ice is not included.

The kinematic viscosities of crude and heat-treated products are measured in modified Cannot-Fenske-Ostwald viscometers. These viscometers are filled in an oxygen-free dry-box and are provided with three-way stop-cocks to allow the raising of the liquid level with nitrogen.

The absolute pressure exerted by the crude and heat-treated products is measured with a bubble-off manometer. Approximately five milliliters of material is sealed in a tube, equipped with a break seal, which is sealed to the manometer. With the sample frozen in a liquid nitrogen bath, the entire system is evacuated and then isolated by closing the stopcock. The sample then is allowed to warm to room temperature. Pressure readings are taken daily for the first week and thereafter weekly, for the duration of the test. All pressure readings of the sealed sample are corrected for changes in barometric pressure.

The specific gravity of the crude products is determined at 77° F. with a hydrometer. Freezing points are measured using capillary tubes placed in a copper block containing vertical holes for the sample tube and the thermometer and a horizontal hole for observation.

TABLE II.—HEAT STABILIZATION OF A METHYLACETYLENE-DIBORANE PRODUCT*

| Time, Minutes | Temperature, °C. | Weight Loss, Percent | Boron, Percent | Viscosity (Centistokes) |
|---|---|---|---|---|
|  |  |  | 29.8 | 3.4. |
| 5 | 100 | 5 | 28.3 | 3.5. |
| 15 | 100 | 7 | 27.8 | 3.5. |
| 30 | 100 | 8 | 28.2 | 3.8. |
| 5 | 150 | 11 | 26.9 | 4.4. |
| 15 | 150 | 15 | 26.0 | 7.7. |
| 30 | 150 | 17 | 27.0 | 29.7. |
| 5 | 200 | 19 | 27.0 | 185.0. |
| 10 | 200 | 23 | 30.8 | Sample very viscous. |

*The time-pressure relationship of these heat-treated portions of the methylacetylene-diborane reaction product together with that of the control sample is presented in Figure 1.

A measure of the stability of the non-volatile portion of the methyl acetylene-diborane reaction product is its change in pressure with time. FIGURE 1 indicates that the stability of this product increases markedly with heat treatment and that particularly stable products are obtained by heat treatments at 150° C. for periods of 15 and 30 minutes. Table II indicates that the boron content of heat treated product decreases and that the weight loss increases with severity of heat treatment. The limiting factor in the severity of the heat treatment, however, appears to be the viscosity of the product which increases with the severity of treatment. For example, for use as high energy fuels in gas turbine engines, the viscosity of the fuel should be reasonably low, i.e., less than 50–100 centistokes at normal temperatures. For ramjet and afterburner applications, however, viscosities of the order of 1000 centistokes can be tolerated. Thus the viscosity of the stabilized methyl acetylene-diborane reaction product should be controlled by control of the severity of the heat treatment of this invention to provide a stabilized product having a viscosity such that when the product is used alone or in admixture with other materials as a high energy fuel, its viscosity is compatible with the particular feed or pumping system employed therewith.

EXAMPLE II

Part 1

A mixture of hydrogen and diborane is reacted with a mixture of hydrogen and acetylene in the apparatus and under similar conditions as described in Example I, Part 1. The pertinent data with respect to four runs are presented in Table III which follows.

TABLE III

| Oil Temp., °C. | Observed Reaction Temp., °C. | Reaction Time (Min.) | Flow Rate, $B_2H_6$, ml./min. | Flow Rate, $C_2H_2$, ml./min. | Flow Rate, $H_2$, ml./min. | Flow Rate ratio, $H_2:B_2H_6:C_2H_2$ | Wt. of Reaction Product (GMS) | Percent B, Average Values |
|---|---|---|---|---|---|---|---|---|
| 133–148 | 121–141 | 80 | 678 | 295 | 4,130 | 14:2.3:1 | 39 | 34.59 |
| 135–147 | 123–133 | 431 | 852 | 295 | 4,130 | 14:2.9:1 | 140 | 36.73 |
| 141–147 | 130–135 | 325 | 740 | 295 | 4,120 | 14:2.5:1 | 143 | ---------- |
| 145–147 | 127–130 | 95 | 843 | 295 | 4,120 | 14:2.9:1 | 56 | ---------- |

The liquid products of these four runs are combined.

Part 2

The combined liquid products of the above Part 1 are then stabilized in the apparatus and according to the procedures of Example I, Part 2. The conditions and results of heat-treating an acetylene-diborane reaction product are summarized in Table IV below.

TABLE IV.—HEAT STABILIZATION OF AN ACETYLENE-DIBORANE REACTION PRODUCT

| Time, Min. | Temp., °C. | Wt. Loss, Percent | Boron, Percent | Viscosity, Centistokes |
|---|---|---|---|---|
|  |  |  | 36.7 | 10.0 |
| 5 | 100 | 1 | 36.3 | 14.6 |
| 10 | 150 | 13 | 35.7 | 53.6 |
| 20 | 150 | 16 | 36.5 | 123.0 |

The time-pressure relationship of these heat-treated portions of the acetylene-diborane reaction product together with that of the control sample is presented in FIGURE 2. This figure indicates that more severe heat-treating conditions produce the most stable product. Table IV indicates that the boron content of the heat treated product does not change appreciably with severity of treatment. The limiting factor in the severity of the heat treatment again appears to be the viscosity of the product which increases with the severity of treatment.

Although the heat-treatment process of this invention has been described with respect to the particular diborane-acetylene and diborane-methylacetylene reaction products of Examples I and II, the process of this invention is applicable to such reaction products produced according to less limited ranges of reaction conditions. For example, the temperatures employed may range from about 100° C. to 250° C. The relative amounts of diborane and acetylene hydrocarbons used can be varied widely, the molar ratio of diborane to acetylene hydrocarbon being within the range from 0.5:1 to 10:1. The amounts of diluent gas such as hydrogen, nitrogen, argon, or mixtures thereof, can also be varied widely, the amount so introduced in practice being dependent upon the amount of diluent required to effect essential mixing and heat transfer necessary for any particular mode of operation. In general, the gases entering the reaction system (diborane, acetylene hydrocarbon and diluent gas) will be composed of from about 20 to 90 percent by volume of diluent gas. Instead of the indirect heat exchange system described in Example I for initiating and maintaining the appropriate reaction temperature, a direct heat exchange system may be employed such as, for example, a mass of mercury through which the reactant gases are passed.

I claim:

A method for the stabilization with respect to vapor pressure of liquid reaction products of diborane and a material selected from the class consisting of acetylene and methylacetylene which comprises heating such reaction products at 140° to 200° C. for from 10 to 45 minutes.

No references cited.